(12) United States Patent
Murdock et al.

(10) Patent No.: US 6,967,477 B1
(45) Date of Patent: Nov. 22, 2005

(54) ADAPTIVE GEARTOOTH SENSOR WITH DUAL PEAK DETECTORS AND TRUE POWER ON CAPABILITY

(75) Inventors: Joseph K. Murdock, Freeport, IL (US); Greg R. Furlong, Freeport, IL (US); Peter G. Hancock, Plano, TX (US); Fred W. Hintz, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/003,845

(22) Filed: Dec. 2, 2004

(51) Int. Cl.[7] ................................................. G01B 7/30
(52) U.S. Cl. ....................................................... 324/207.25
(58) Field of Search .............................. 324/173–174, 324/207.13–207.21, 207.22, 207.23, 207.25, 324/242–244, 251, 260; 123/612, 617

(56) References Cited

U.S. PATENT DOCUMENTS

| | | | |
|---|---|---|---|
| 5,469,054 A | 11/1995 | Bicking | 324/207.2 |
| 5,694,040 A | 12/1997 | Plagens | 324/207.2 |
| 5,698,777 A | 12/1997 | Ramseyer et al. | 73/116 |
| 6,073,713 A | 6/2000 | Brandenburg et al. | 180/65.2 |
| 6,597,205 B2 | 7/2003 | Powell et al. | 327/48 |
| 6,727,689 B1 | 4/2004 | Furlong et al. | 324/207.25 |
| 6,759,843 B2 | 7/2004 | Furlong | 324/207.2 |
| 2004/0130315 A1 | 7/2004 | Lamb et al. | 324/207.2 |

Primary Examiner—Bot LeDynh
(74) Attorney, Agent, or Firm—Kris T. Fredrick; Kermit D. Lopez; Luis M. Ortiz (57) ABSTRACT

Methods and systems for detecting a rotating target are disclosed herein, wherein a biasing magnet is associated with a rotating target in association with a dual peak detector. The rotating target generally comprises a plurality of teeth and at least one slot formed between at least one tooth of the rotating target. In general, the biasing magnet and the rotating target generate a magnetic signal having positive and negative peaks thereof. The dual peak detector includes a tooth detector and a slot detector, such that the dual peak detector detects a minimum and maximum peak of the magnetic signal generated by the biasing magnet and the rotating target. Additionally, a clamping circuit can be associated with the dual peak detector, wherein the clamping circuit can provide a true power on (TPO) functionality.

25 Claims, 8 Drawing Sheets

ADAPTIVE GEARTOOTH SENSOR WITH DUAL PEAK DETECTORS AND TRUE POWER ON CAPABILITY

TECHNICAL FIELD

Embodiments are generally related to sensor devices, methods and systems. Embodiments are also related to cam and crankshaft sensors utilized in automotive applications. Embodiments are additionally related to Hall devices and True Power On (TPO) applications and capabilities.

BACKGROUND OF THE INVENTION

Various sensors are known in the magnetic-effect sensing arts. Examples of common magnetic-effect sensors include Hall effect and magnetoresistive technologies. Such magnetic sensors generally respond to a change in the magnetic field as influenced by the presence or absence of a ferromagnetic target object of a designed shape passing through the sensory field of the magnetic-effect sensor. The sensor can then provide an electrical output, which can be further modified as necessary by subsequent electronics to yield sensing and control information. The subsequent electronics may be located either onboard or outboard of the sensor package.

Many of the sensors utilized in automotive applications are configured as position sensors, which provide feedback to a control unit. Many of these types of sensors and related systems are mechanical in nature and are very sensitive to the wearing of contacts, contact contamination, and so forth. To help solve many of the warranty problems associated with mechanical sensors, designers have searched for non-contacting electrical solutions provided by magnetoresistive and/or Hall-effect technologies, which have attempted to detect variance in a magnetic field. One of the primary problems with this approach is the inability of such systems to accurately detect position. The accuracy requirement of such systems makes it difficult, for example, to use a single Hall element because of the offset and shifts over temperature.

The difficulty with both Hall and magnetoresistive technologies is that high accuracy switching points at both low and high RPM's are difficult to achieve. Positions sensors must meet high repeatability requirements for both camshaft and crankshaft applications in automotive devices. In particular, camshaft sensors for newly developed engines require tighter accuracy over all environmental conditions and the ability to determine if the sensor is sensing a target tooth or a target slot as soon as power is applied (i.e., "True Power On" or TPO). Such features allow the engine to be activated sooner and run more efficiently. The present inventor has thus concluded that a need exists for an improved adaptive sensing method and system that can provide high accuracy and highly repeatable switch points through a complete RPM range. The present invention is therefore directed toward improved magnetic sensing methods and systems.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved sensor devices, methods and systems.

It is another aspect of the present invention to provide for improved sensors for utilization in automotive applications.

It is yet another aspect of the present invention to provide for dual peak detectors in association with True Power On (TPO) capabilities.

It is still a further aspect of the present invention to provide for improved camshaft sensors.

The aforementioned aspects of the invention and other objectives and advantages can now be achieved as described herein. Methods and systems for detecting a rotating target are disclosed herein, wherein a biasing magnet is associated with a rotating target in association with a dual peak detector. The rotating target generally comprises a plurality of teeth and at least one slot formed between at least one tooth of the rotating target. In general, the biasing magnet and the rotating target generate a magnetic signal having a minimum and maximum peak thereof. The dual peak detector includes a tooth detector and a slot detector, such that the dual peak detector detects a minimum and maximum peak of the magnetic signal generated by the biasing magnet and the rotating target. Additionally, clamping circuits can be associated with the dual peak detector, wherein the clamping circuits can provide a true power on (TPO) functionality.

Such TPO functionality can be obtained by setting the minimum value for the tooth detector of the dual peak detector and the maximum value for the slot detector of the dual peak detector, thereby permitting the rotating target to be sensed as soon as power is applied to the sensor. Also, one or more capacitors can be associated with the clamping circuit, wherein such a capacitor(s) maintains the minimum value for the tooth detector of the dual peak detector and the maximum value for the slot detector of the dual peak detector. Those skilled in the art will appreciate that these maximum and minimum values can also be stored using digital techniques, including D to A converters and storage registers.

The switching level associated with the dual peak detector can be trimmed into the IC at approximately 30% to 70% of the positive and negative peaks of the magnetic signal generated by the biasing magnet and the rotating target. In general, the biasing magnet along with the target produces the magnetic field that is measured by the sensing element (e.g., a Hall-effect element).

The biasing magnet is preferably calibrated during assembly, such that the magnetic field associated with the biasing magnet and rotating target is centered at some known value. Additionally, a DC-coupled switch point circuit or sub-circuit can be provided for communicating the calibration position of the biasing magnet. The DC-coupled switch point circuit can be located within an integrated circuit (IC) in association with the sensing element, the dual peak detector, the clamping circuit, and so forth. A second DC switch point circuit can be utilized to provide the proper drive to an appropriate output driver stage.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment and are not intended to limit the scope of the invention.

Figure 1A:
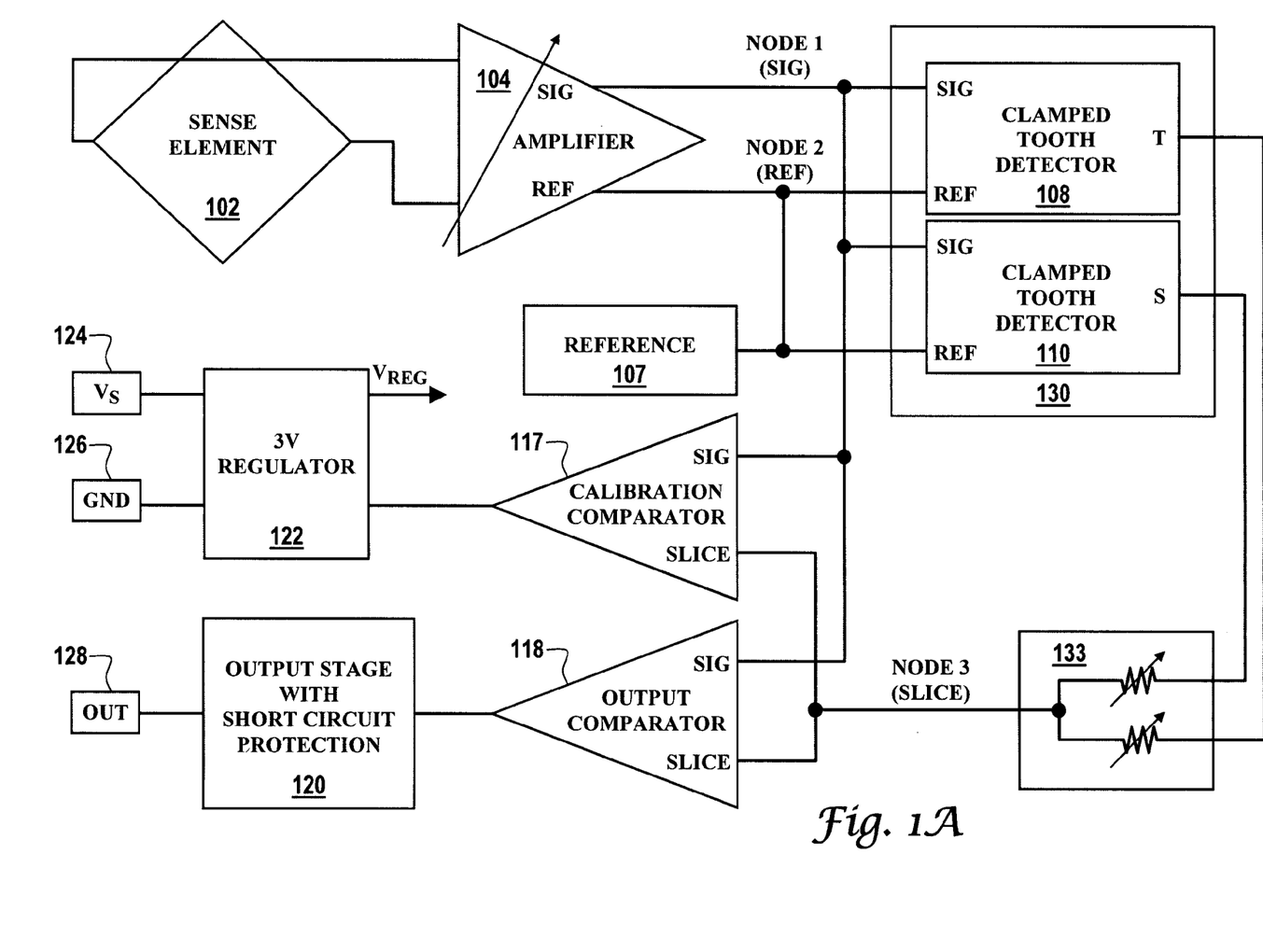
FIG. 1(a) illustrates a schematic diagram of a dual-detector system, which can be implemented in accordance with a preferred embodiment.
Figure 1B:
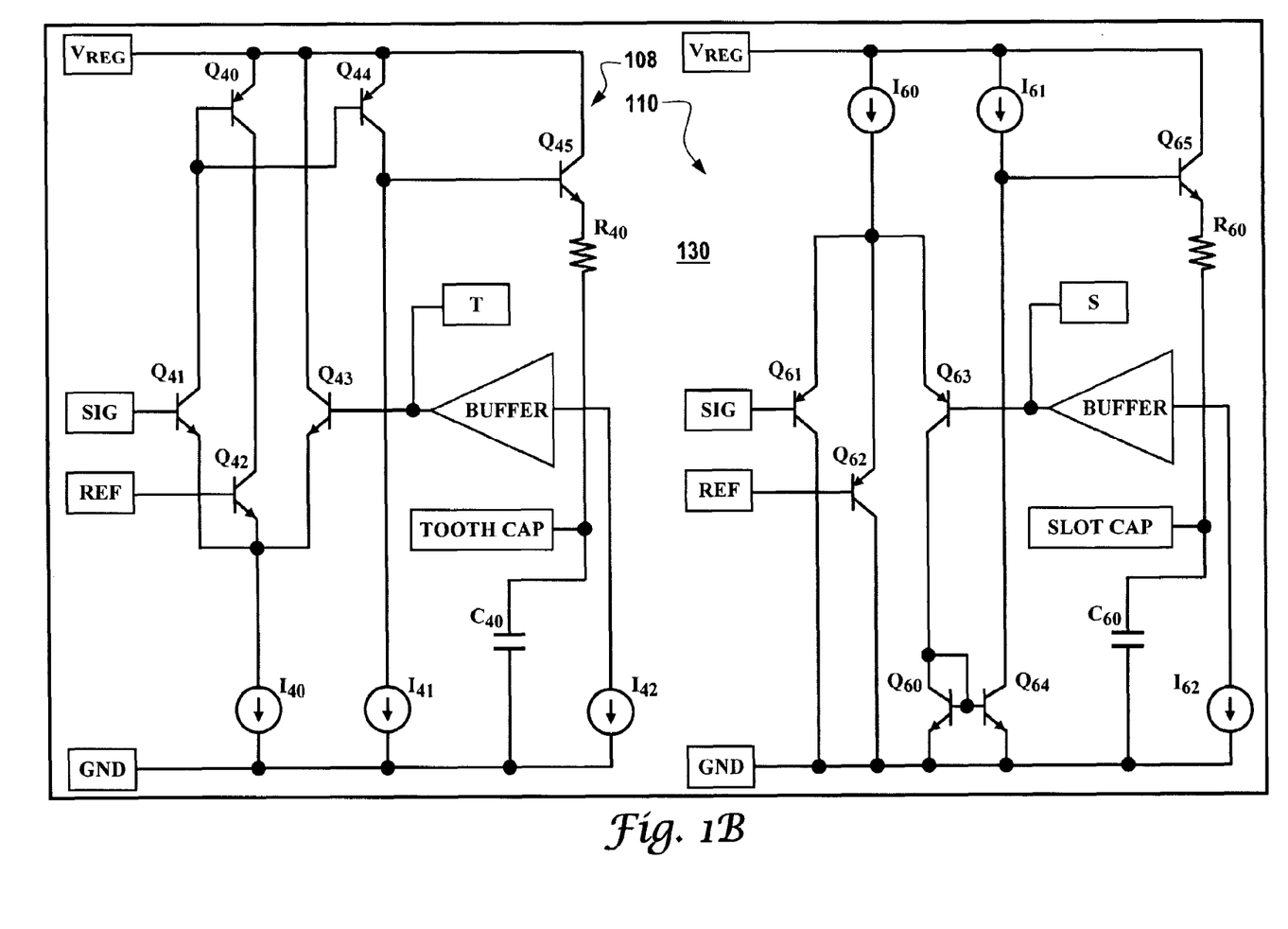
FIG. 1(b) illustrates a schematic diagram of a dual peak detector that can be adapted for utilization with the dual-detector system depicted in FIG. 1(a) in accordance with a preferred embodiment.

FIG. 1(a) illustrates a block diagram of a dual-detector system 100, which can be implemented in accordance with a preferred embodiment of the present invention. FIG. 1(b) illustrates a schematic diagram of a dual peak detector 130 that can be adapted for utilization with the dual-detector system depicted in FIG. 1(a) in accordance with a preferred embodiment. Note that in FIGS. 1(a) and 1(b), identical or similar parts are generally indicated by identical reference numerals.

Figure 2:
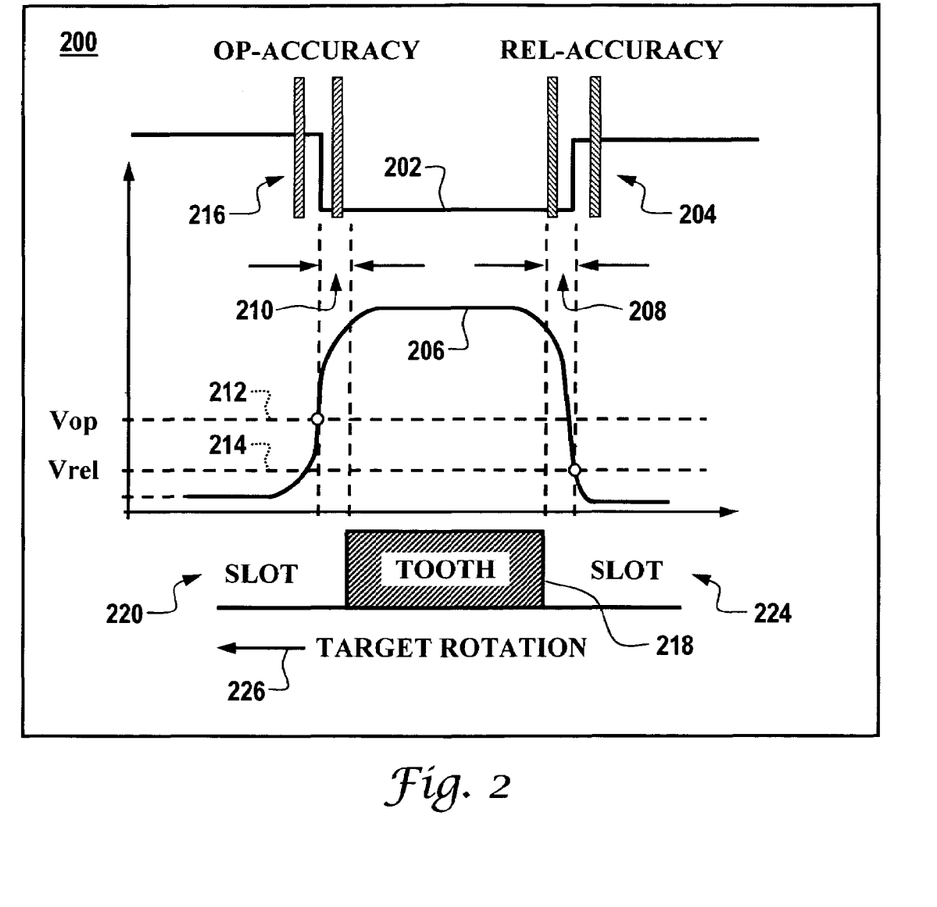
FIG. 2 illustrates a graph generally indicating switching tolerances.

System 100 generally includes a sensing element 102, which can be associated with and/or interact with a rotating target and biasing magnet, such as, for example, targets 220, 218 and/or 224 depicted in FIG. 2. The biasing magnet 508 possesses a magnet field such that the biasing magnet 508 and the rotating target generate a magnetic signal having positive and negative peaks thereof. System 100 further includes a signal amplifying circuit 104 used to amplify and condition the input signals from the sense element 102 and a voltage reference generator 107. Circuit 104 can be used to amplify and shift the signals to an appropriate level.

System 100 also includes dual peak detector 130 (which is shown in greater detail in FIG. 1(b)) that can be configured to include a tooth detector 108 and a slot detector 110, wherein the dual peak detectors 108 and 110 detect positive and negative peaks of the magnetic signal generated by the biasing magnet, the sensing element 102 and the rotating target. Examples of rotating targets, which can be detected by system 100, cam targets 302 and 304 illustrated in FIG. 3.

Tooth detector 108 and slot detector 110 further includes clamping circuits that provides a true power on (TPO) functionality, wherein the clamping circuit is associated with the dual peak detector 130, such that the TPO functionality is obtained by setting a minimum value for the peak detector 108 of the dual peak detector 130 and a maximum value for the slot detector 110 of the dual peak detector 130, thereby permitting the rotating target to be sensed as soon as power is applied to rotate the rotating target.

The sense element 102 can be implemented as a Hall magnetic device or another magnetoresistive device. Sense element 102 can be connected to an amplifier 104, which can function as a variable amplifier. The output from amplifier 104 can be coupled to a voltage reference circuit 107. Those skilled in the art will realize that the voltages on nodes 1 and 2 are related: Sig−Ref=B*K* Sens, where K is a gain term, and Sens represents the sensitivity of the sense element and B is the applied magnetic field.

In a typical embodiment the value of B crosses through a particular value, Bo, situated between the minimum tooth and maximum slot values of the magnetic signal. In the preferred embodiment, Bo=0 and Sig= Ref when B=Bo. Thus the voltage signal on Node 1 crosses the reference voltage on Node 2 as the magnetic signal moves between it's tooth and slot values. Nodes 1 and 2 carry the signal and reference voltages to the inputs of the dual peak detector system 130 depicted in FIG. 1(b). It can be appreciated from FIG. 1(b) that if the signal voltage (Sig) is less than the reference voltage (Ref) then Q41 is reverse biased and negative feedback will cause the differential stage Q42, Q43 to balance. Thus, T (and Tooth Cap) can attain a value equal to Ref. However, if Sig is greater than Ref, then Q42 is reverse-biased and negative feedback will cause the differential stage Q41, Q43 to balance. In this case T (and Tooth Cap) attain a value equal to Sig. Thus, the value of T is the most positive of Ref and Sig, and clamping is achieved. Similarly, it can be appreciated that one skilled in the art can deduce that the value of S is the lesser of Sig and Ref and will recognize that the polarity of Slot Cap is inverted.

Note that capacitors 135 and 137 can be utilized to capture the positive and negative peaks of waveforms. Very small discharge currents are incorporated to ensure that the capacitor voltages decay in an appropriate fashion. The dual peak detector outputs S and T are connected to a trim network 133. Resistors 114 and 116 function series with one another and are tied to one another at Node 3, which in turn is connected to an input (i.e., "Slice") of a calibration comparator 117 and an input (i.e., "Slice") of an output comparator circuit 118.

In the preferred embodiment, resistors 114 and 116 are trimmed such that the voltage on Node 3 (i.e., Slice) is a certain fraction of the difference between T and S. Note that a second input (i.e., Sig) of calibration comparator circuit 117 and a second input (i.e., Sig) of output comparator circuit 118 are both connected to the signal voltage on Node 1. In an alternative configuration the slice input of the calibration comparator can be connected to Node 2 (i.e., ref voltage). Hysteresis is included in the comparator circuits 117 and 118 to prevent chattering and false triggering associated with noise and slowly varying inputs.

System 100 can also include a voltage regulation stage 122 and an output driver 120 to properly match the application requirements. Output stage 120 may be configured as an open collector stage and may include a means to protect the circuitry against accidental shorting. Regulator 122 may include means for protecting system 100 from over-voltage or reverse supply conditions.

In general, system 100 utilizes dual peak detector 130 to find both the positive and the negative peaks of the magnetic signal generated by the biasing magnet, sense element 102 and the rotating target. Such tooth/slot values can be maintained with an external capacitor, such as, for example capacitors 135 and/or 137 in conjunction with Buffer Amplifiers 136 and 138. System 100 can be implemented in the context of an integrated circuit (IC). The switching level of system 100 can be trimmed into such an IC at approximately 30% to 70% of these peaks, depending on the target configuration. In the preferred embodiment then, the magnetic signal, Sig varies around the recovered slicing level, Slice. Comparator 118 transmits this information to the output. This aspect of system 100 provides high accuracy and repeatability.

The TPO functionality can be obtained by setting a minimum value for the tooth detector 108 and a maximum value for the slot detector 110. Thus, if system 100 powers up on a tooth (i.e., a target), the tooth detector 108 will be at a high magnetic field (i.e., depending on the air gap, which for estimation purposes may be approximately 200 gauss), and the slot detector 110 will be clamped to the reference voltage, which in the preferred embodiment represents zero gauss. Such a calculation positions the operation point at approximately 100 gauss if the switching level is trimmed at 50%. System 100 will then recognize that a tooth is present as Sig>Slice.

Likewise if system 100 powers up on a slot, the tooth detector 108 will be clamped to zero gauss whereas the slot detector 110 will attain a voltage representative of the field of the slot (say −100 gauss). In this case the operating point will be at −50 gauss and system 100 will recognize the presence of a slot, as Sig<Slice. System 100 can therefore transmit information beginning with a feature of a rotating target having a plurality of teeth and slots formed there between.

FIG. 2 illustrates a graph 200 generally indicating switching tolerances. Graph 200 indicates an operate accuracy 216 and a release accuracy 204 which are located at opposing ends of a digital output signal 202, which corresponds approximately with the length of a target 218 of a rotating target. In this context "Operate" refers to the slot to tooth transition and "Release" refers to the tooth to slot transition. Target 218 is a tooth, while targets 220 and 224 comprise slots formed at either side of target 218 (i.e., the tooth). Target rotation is generally indicated by arrow 226.

A hard edge offset 210 can be located to the left of analog output signal 206. Similarly, a hard edge offset 208 can be located to the right of analog output signal 206. An operate voltage 212 and a release voltage 214 are also depicted in graph 200. Those skilled in the art will appreciate that the operate voltage Vop is in fact the sum of the magnetic signal, Sig and the hysteresis of the output comparator 118, i.e. Vop= Sig+Hyst. Likewise Vrel=Sig−Hyst. Note that graph 200 is not considered a limiting feature of the present invention, but is presented for generally illustrative and edification purposes only.

Figure 3:
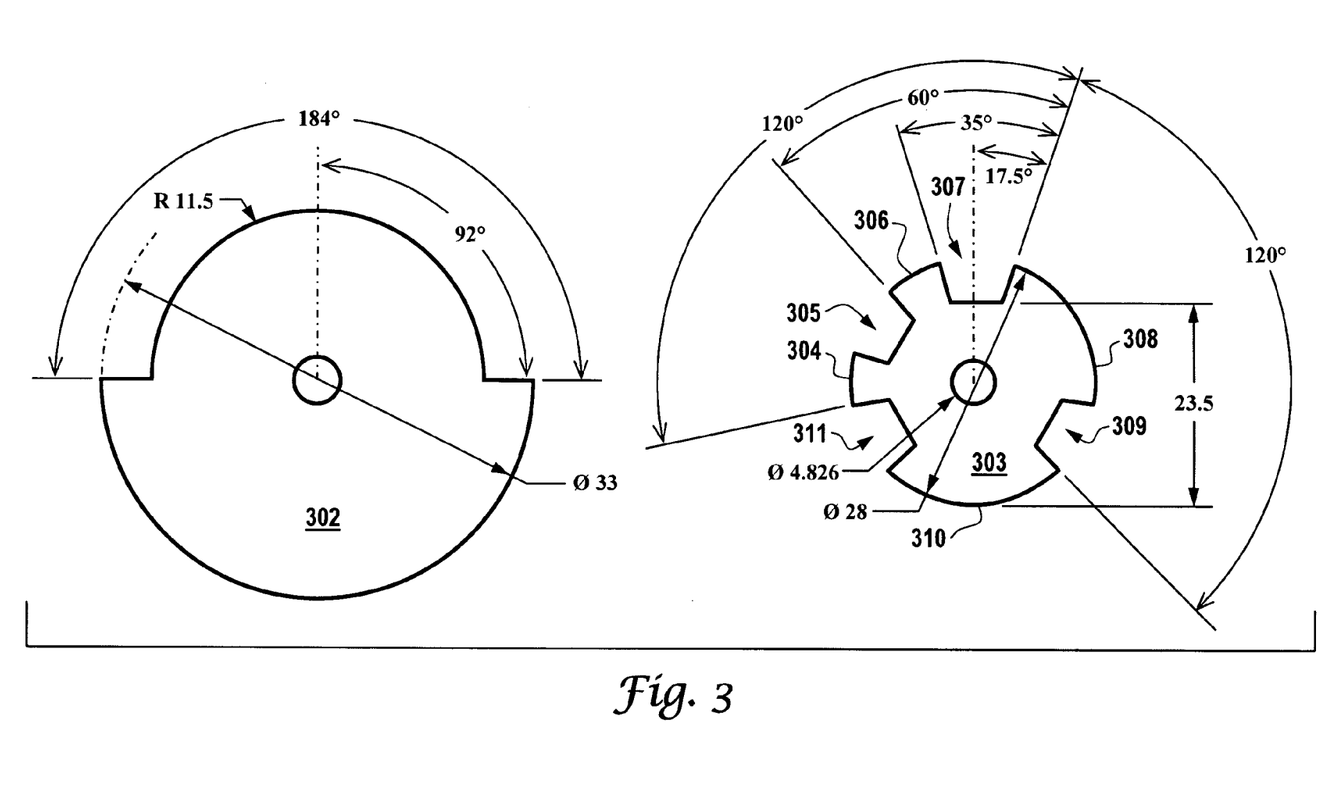
FIG. 3 illustrates cam targets, which can be utilized in accordance with a preferred embodiment.

FIG. 3 illustrates examples of cam targets 302 and 304, which can be utilized in accordance with a preferred embodiment. Cam targets 302 and 304 are examples of rotating targets which can be detected by system 100 illustrated in FIG. 1(*a*) in associate with the configuration depicted in FIG. 1(*b*). Cam target 304, for example, includes one or more teeth 304, 306, 308 and 310 of varying size and shape. A slot 305 can be formed between tooth 304 and 305. Similarly, a slot 307 can be formed between tooth 306 and 308. Likewise, a slot 309 can be formed between tooth 308 and 310. Finally, a slot 311 can be formed between tooth 310 and 304. Thus, cam target 304 can be implemented as a rotating target that includes a plurality of teeth and respective slots formed therebetween.

Figure 4:
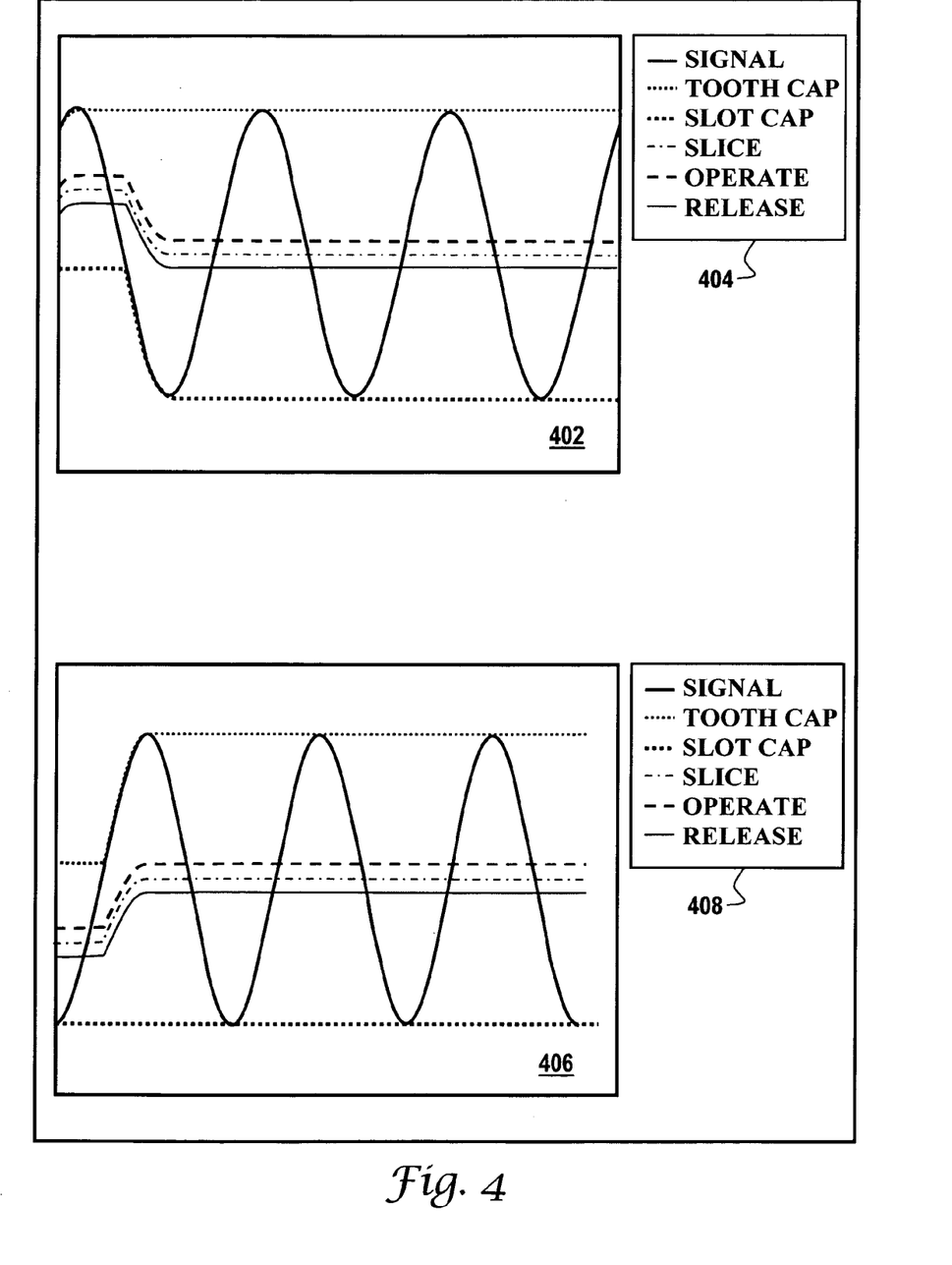
FIG. 4 illustrates a graph depicting signal levels at power-up with positive and negative Gauss signals in accordance with one embodiment.

FIG. 4 illustrates a graph 402 depicting signal levels at power-up with a positive Gauss signal and a graph 406 depicting signal levels at power-up with a negative Gauss signal in accordance with one embodiment. Graph 402 is generally associated with a legend 404 depicting a Signal, Tooth cap, Slot cap, slicing level, operate and release levels. Graph 406 is associated with a similar legend 408.

In graph 402, initially, a tooth cap signal matches a transducer signal, and a slot cap signal clamps at 0 Gauss. The initial slicing level is determined by these levels, and the device is initially operated, since the signal level is above the operate level. As the transducer signal drops to a negative value, the slot cap signal tracks the transducer signal until the lowest point is reached, and the tooth cap signal may decay towards, but not less than, zero. At some point the Sig level will fall below the release value and the circuit will release. As speed increases, the tooth and slot cap signals reach their steady state values, the slicing level adjusts accordingly.

In graph 406, initially the slot cap signal matches the transducer signal, and the tooth cap signal clamps at 0 Gauss. The initial slicing level is determined by these levels, and the device is initially released, since the signal level is below the release level. As the transducer signal increases to a positive value, the tooth cap signal tracks the transducer signal until the highest point is reached and the slot cap signal may decay towards, but not greater than, zero. At some point the Sig level will rise above the operate value and the circuit will operate. As speed increases, the tooth and slot cap signals reach their steady state values, the slicing level adjusts accordingly.

Figure 5:
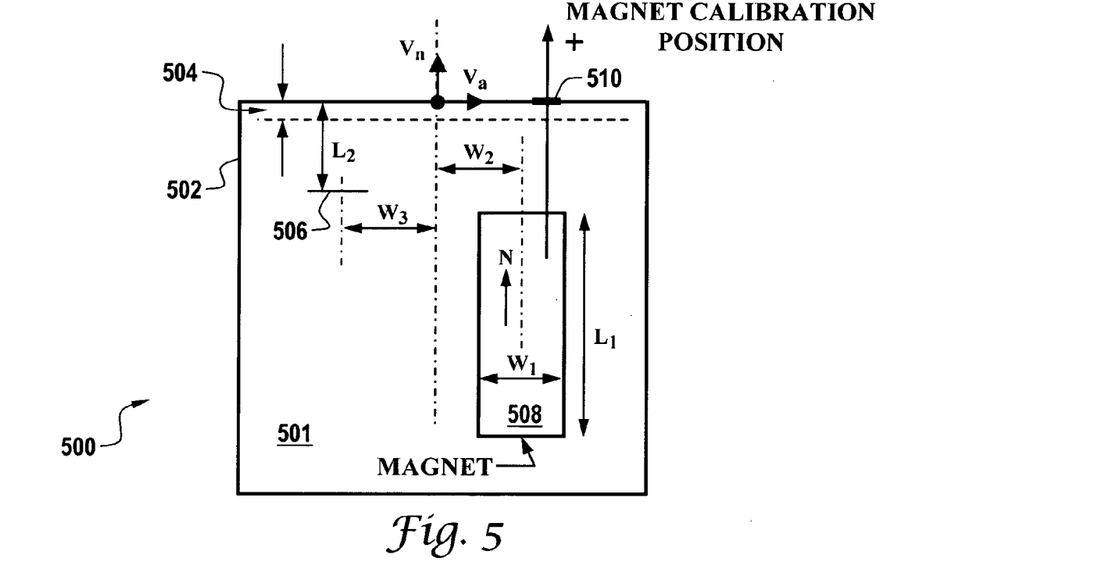
FIG. 5 illustrates a block diagram of an adaptive Hall sensor configuration, which can be adapted for use in accordance with a preferred embodiment.

FIG. 5 illustrates a block diagram of an adaptive Hall sensor configuration 500, which can be adapted for use in accordance with a preferred embodiment. Configuration 500 can be implemented in the context of a sensor package 501. A Hall element 506 can be disposed a length $L_2$ from the package face 502. The center of Hall element 506 can be disposed a width $W_3$ from the center of package 501. A magnet 508 can be disposed a width $W_2$ from the center of package 501. Magnet 508 generally possesses a width $W_1$ and a length $L_1$. A magnet calibration position 510 is also noted in configuration 500.

Figure 6:
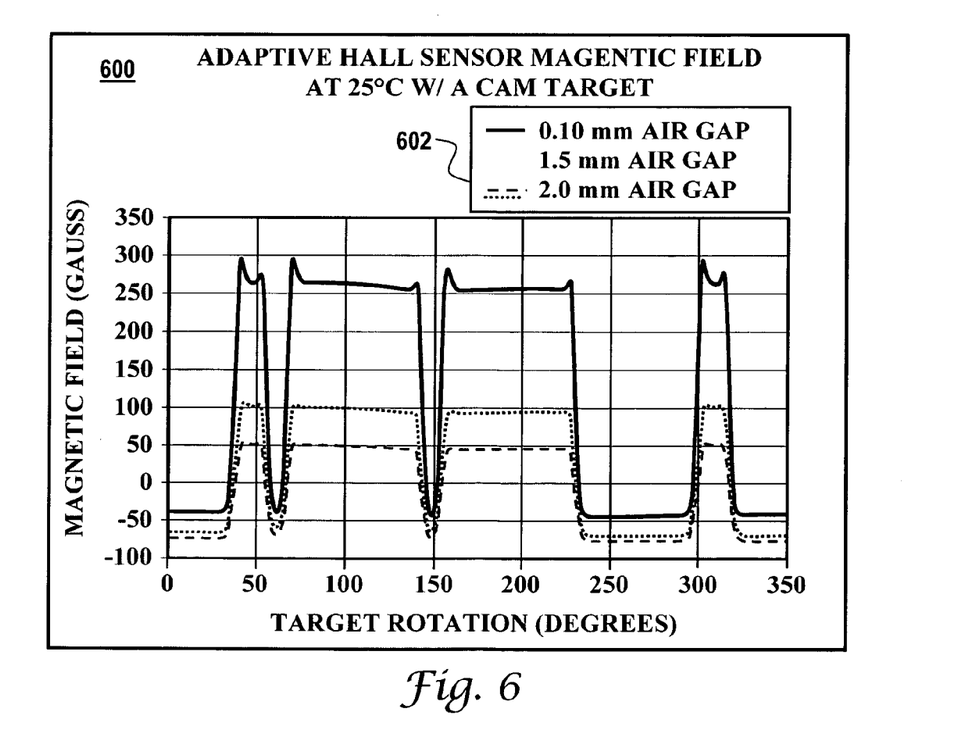
FIG. 6 illustrates a graph depicting an exemplary adaptive Hall-effect sensor magnetic field in accordance with a preferred embodiment.

FIG. 6 illustrates a graph 600 depicting an exemplary adaptive Hall sensor magnetic field in accordance with a preferred embodiment. Graph 600 generally indicates an adaptive Hall sensor magnetic field at 25° C. with a cam target, such as, for example cam targets 302 and 304 depicted in FIG. 3. Such an adaptive Hall sensor magnetic field can be implemented via, for example, biasing magnet 102 depicted in FIG. 1 in association with system 100 thereof. A legend 602 is associated with graph 600 and includes varying air gap lengths. Respective data indicative of magnetic field (i.e., gauss) versus target rotation (in degrees) is depicted in graph 600.

Figure 7:
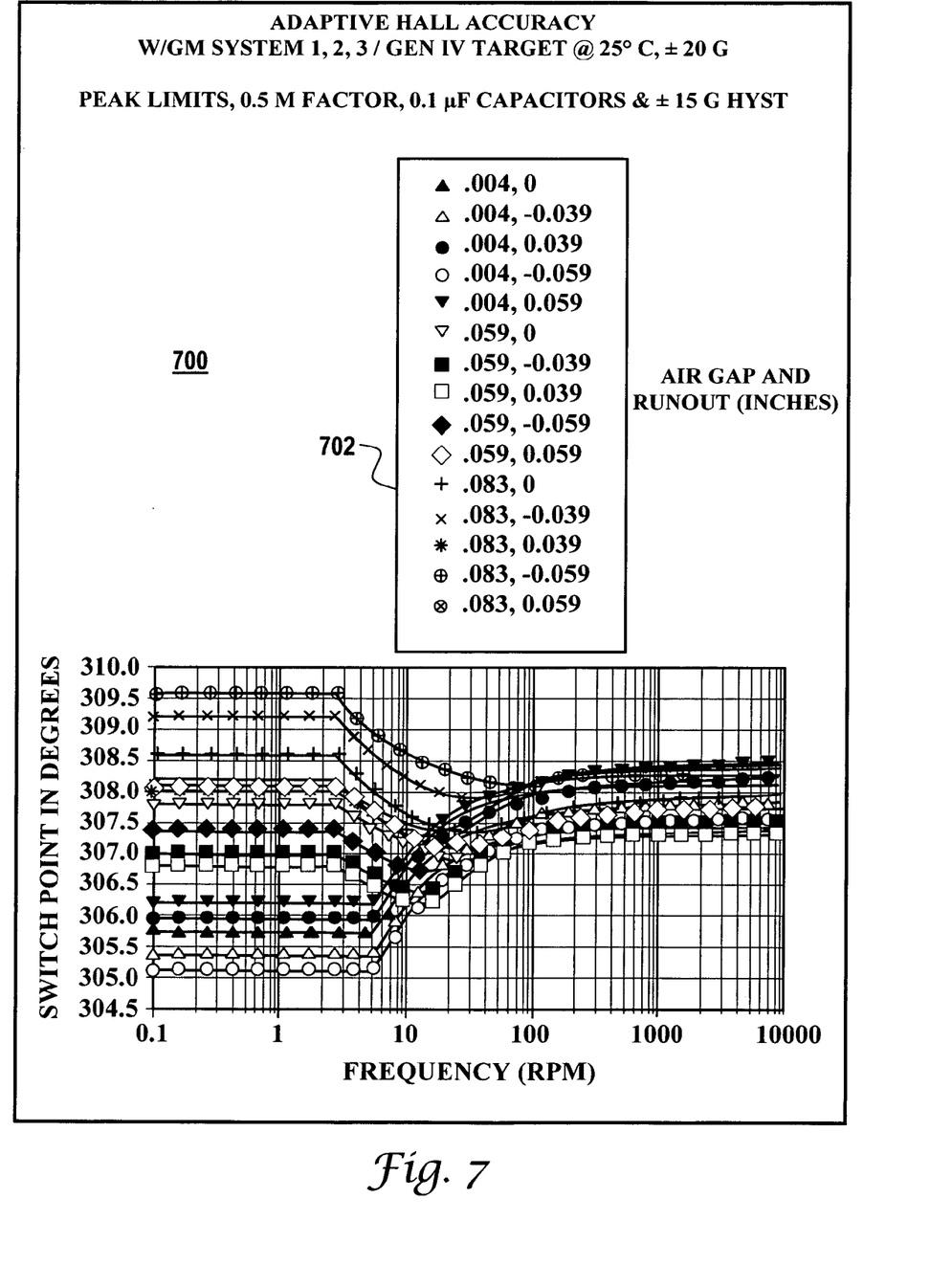
FIG. 7 illustrates a graph depicting adaptive Hall accuracy as a function of frequency and switching points, in accordance with a preferred embodiment.

FIG. 7 illustrates graph 700 depicting adaptive hall accuracy as a function of frequency and switching points, in accordance with a preferred embodiment. The data indicated in graph 700 can be generated via system 100 of FIG. 1. Graph 700 illustrates adaptive Hall accuracy generated by system 100 in association with a rotating target at 25° C., +/−20 G peak limits, 50%, 0.1 uF capacitors (e.g., capacitors 137 and 135 of FIG. 1) and +/−15 G Hyst. A legend 702 is associated with graph 700, which plots switching point in degrees versus frequency (RPM).

Figure 8:
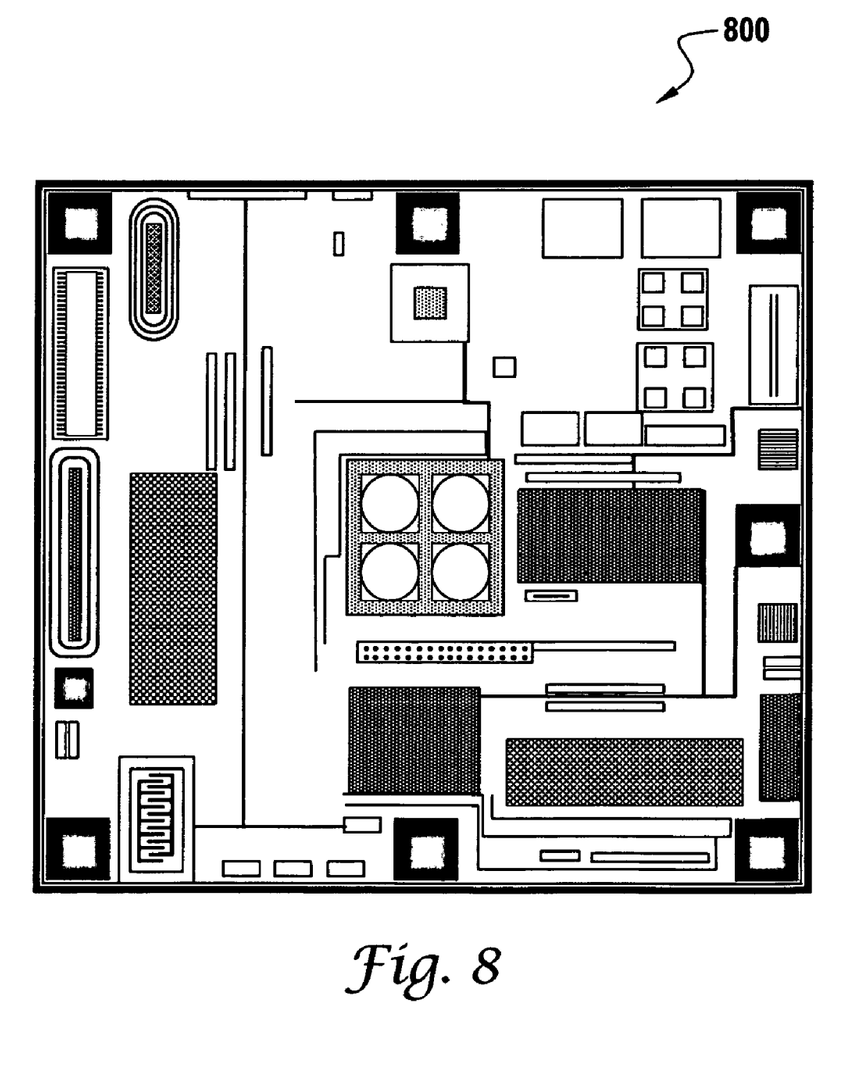
FIG. 8 illustrates an image of the adaptive Hall embodiment as an integrated circuit (IC), in accordance with the preferred embodiment.

FIG. 8 illustrates a block diagram of an adaptive Hall IC 800, which can be implemented in accordance with an alternative embodiment of the present invention. Adaptive Hall IC 800 can be utilized to implement system 100 of FIG. 1. In general, system 100 and IC 800 can function as an adaptive Hall sensor that offers excellent accuracy (e.g., less than +/−1.25°) on cam targets, such as, for example, cam targets 302 and 304. The adaptive Hall sensor of system 100 and IC 800 offers TPO for most cam targets and a slice level (i.e. switching level) that can be adjusted to suit a specific target to optimize accuracy and air gap performance. System 100 is "twist" insensitive and can function utilizing a reverse voltage and output short circuit protection.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention

What is claimed is:

1. A sensing system, comprising:
    a rotating target associated with a biasing magnet having a magnetic field, wherein said biasing magnet and said rotating target generate a magnetic signal having positive and negative peaks thereof;
    a dual peak detector comprising a tooth detector and a slot detector, wherein said dual peak detector detects positive and negative peaks of said magnetic signal generated by said biasing magnet and said rotating target; and
    a clamping circuit that provides a true power on (TPO) functionality, wherein said clamping circuit is associated with said dual peak detector, such that said TPO functionality is obtained by setting a minimum value for said tooth detector of said dual peak detector and a maximum value for said slot detector of said dual peak detector, thereby permitting said rotating target to be sensed as soon as power is applied to said sensing system.

2. The system of claim 1 further comprising at least one capacitor associated with said clamping circuit, wherein said at least one capacitor maintains said minimum value for said tooth detector of said dual peak detector and said maximum value for said slot detector of said dual peak detector.

3. The system of claim 1 further comprising of D to A converters and storage registers associated with said clamping circuit, wherein said D to A converters and storage registers maintains said minimum value for said tooth detector of said dual peak detector and said maximum value for said slot detector of said dual peak detector.

4. The system of claim 1 further comprising camshaft and crankshaft sensors comprising said clamping circuit, said dual peak detector and said biasing magnet.

5. The system of claim 1 wherein said rotating target comprises a plurality of teeth and at least one slot and at least one tooth of said plurality of teeth.

6. The system of claim 1 wherein said biasing magnet is calibrated during assembly of said system such that said magnetic field associated with said biasing magnet is centered at a specified gauss level.

7. The system of claim 6 further comprising a sensing element that detects a change in magnetic field and converts a resulting magnetic field change into a voltage change.

8. The system of claim 7 further comprising a DC-coupled switch point circuit for communicating a calibration position of said biasing magnet.

9. The system of claim 8 wherein said DC-coupled switch point circuit is located on an integrated circuit (IC) in association with said sensing element, said dual peak detector, and said clamping circuit.

10. The system of claim 9 wherein a switching level associated with said dual peak detector is trimmed into said IC at approximately 30% to 70% of said positive and negative peaks of said magnetic signal generated by said biasing magnet and said rotating target.

11. A sensing system, comprising:
    a rotating target associated with a biasing magnet, wherein said biasing magnet and said rotating target generate a magnetic signal having positive and negative peaks thereof, wherein said rotating target comprises a plurality of teeth and at least one slot and at least one tooth of said plurality of teeth;
    a dual peak detector comprising a tooth detector and a slot detector, wherein said dual peak detector detects positive and negative peaks of said magnetic signal generated by said biasing magnet and said rotating target;
    a clamping circuit that provides a true power on (TPO) functionality, wherein said clamping circuit is associated with said tooth and slot detectors, such that said TPO functionality is obtained by setting a minimum value for said peak detector of said dual peak detector and a maximum value for said slot detector of said dual peak detector, and
    at least one capacitor associated with said clamping circuit, wherein said at least one capacitor maintains said minimum value for said tooth detector of said dual peak detector and said maximum value for said slot detector of said dual peak detector, thereby permitting said rotating target to be sensed as soon as power is applied to the sensor.

12. The system of claim 11 wherein said biasing magnet is calibrated during assembly of said system such that said magnetic field associated with said biasing magnet is centered at a specified gauss level.

13. The system of claim 12 further comprising:
    a DC-coupled switch point circuit for communicating a calibration position of said biasing magnet, wherein said DC-coupled switch point circuit is located on an integrated circuit (IC) in association with said biasing magnet, said dual peak detector, and said clamping circuit; and
    wherein a switching level associated with said dual peak detector is trimmed into said IC at approximately 30% to 70% of said positive and negative peaks of said magnetic signal generated by said biasing magnet and said rotating target.

14. The system of claim 11 further comprising a sensing element that detects a change in magnetic field and converts a resulting magnetic field change into a voltage change.

15. The system of claim 11 further comprising camshaft and crankshaft sensors comprising said clamping circuit, said dual peak detector and said sensing element.

16. A method for detecting a rotating target, said method comprising the steps of:
associating a biasing magnet with a rotating target, wherein said biasing magnet and said rotating target generate a magnetic signal having positive and negative peaks thereof;
providing a dual peak detector comprising a tooth detector and a slot detector, wherein said dual peak detector detects positive and negative peaks of said magnetic signal generated by said biasing magnet and said rotating target;
associating a clamping circuit with said dual peak detector, wherein said clamping circuit can provide a true power on (TPO) functionality; and
obtaining said TPO functionality by setting a minimum value for said tooth detector of said dual peak detector and a maximum value for said slot detector of said dual peak detector, thereby permitting said rotating target to be sensed as soon as power is applied to the sensor.

17. The method of claim 16 further comprising the step of associating at least one capacitor with said clamping circuit, wherein said at least one capacitor maintains said minimum value for said tooth detector of said dual peak detector and said maximum value for said slot detector of said dual peak detector.

18. The method of claim 16 further comprising a plurality of D to A converters and storage registers associated with said clamping circuit, wherein said plurality of D to A converters and storage registers maintains said minimum value for said tooth detector of said dual peak detector and said maximum value for said slot detector of said dual peak detector.

19. The method of claim 16 wherein said rotating target comprises a plurality of teeth and at least one slot and at least one tooth of said plurality of teeth.

20. The method of claim 16 further comprising the step of calibrating said biasing magnet such that said magnetic field associated with said biasing magnet is centered at a specified gauss level.

21. The method of claim 20 further comprising the step of providing a DC-coupled switch point circuit for communicating a calibration position of said biasing magnet.

22. The method of claim 21 further comprising the step of providing a sensing element that detects a change in magnetic field and converts a resulting magnetic field change into a voltage change.

23. The method of claim 22 further comprising the step of locating said DC-coupled switch point circuit on an integrated circuit (IC) in association with said sensing element, said dual peak detector, and said clamping circuit.

24. The method of claim 23 further comprising the step of trimming a switching level associated with said dual peak detector into said IC at approximately 30% to 70% of said positive and negative peaks of said magnetic signal generated by said biasing magnet and said rotating target.

25. The method of claim 15 further comprising the step of configuring a camshaft and a crankshaft sensor to comprise said clamping circuit, said dual peak detector and said biasing magnet, such that said camshaft and crankshaft sensors detect a rotating target of a camshaft or crankshaft.

\* \* \* \* \*